April 15, 1930.  M. J. CALLAHAN  1,754,260
LOW DOWN HEATING AND VENTILATING UNIT
Filed March 14, 1925  5 Sheets-Sheet 2
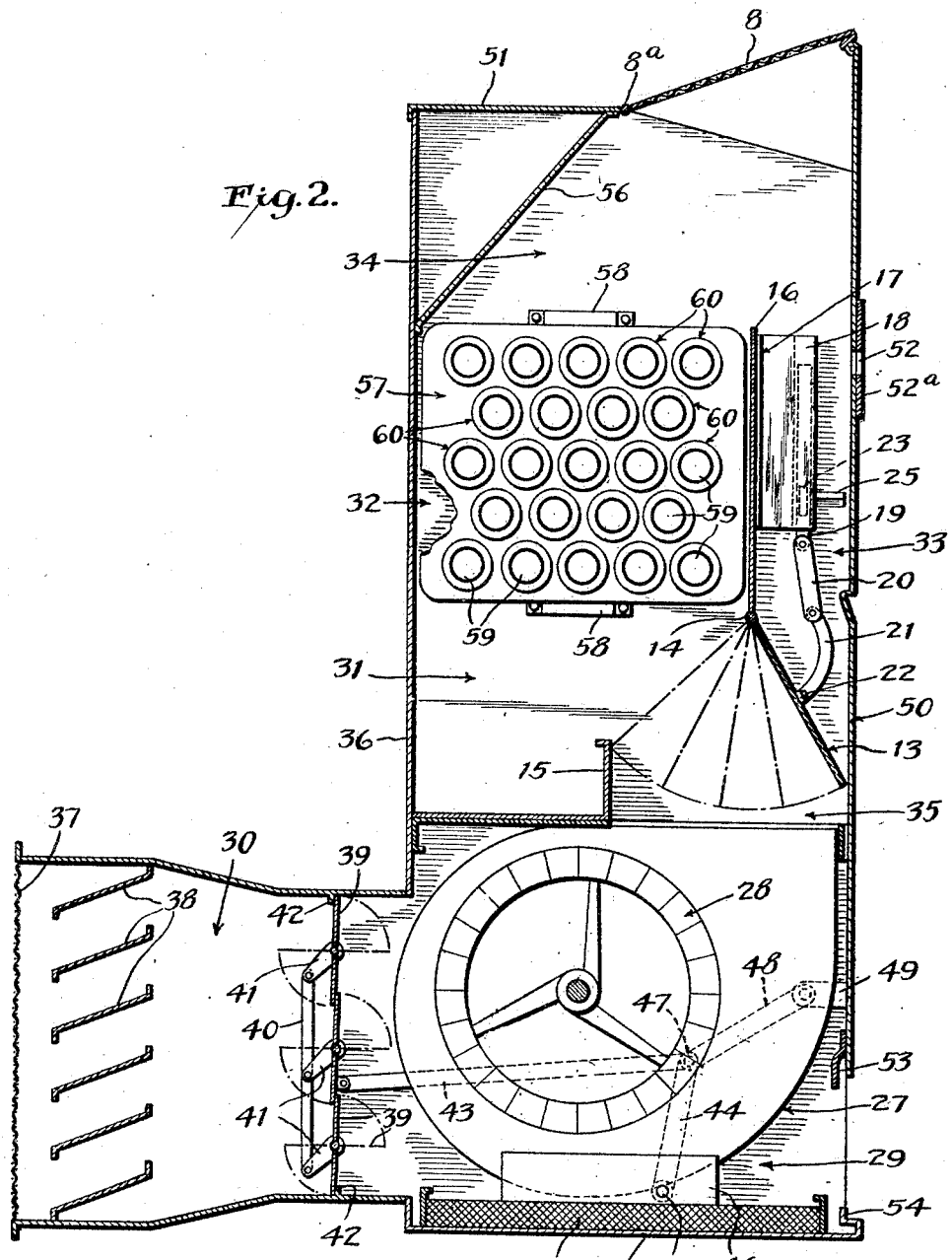

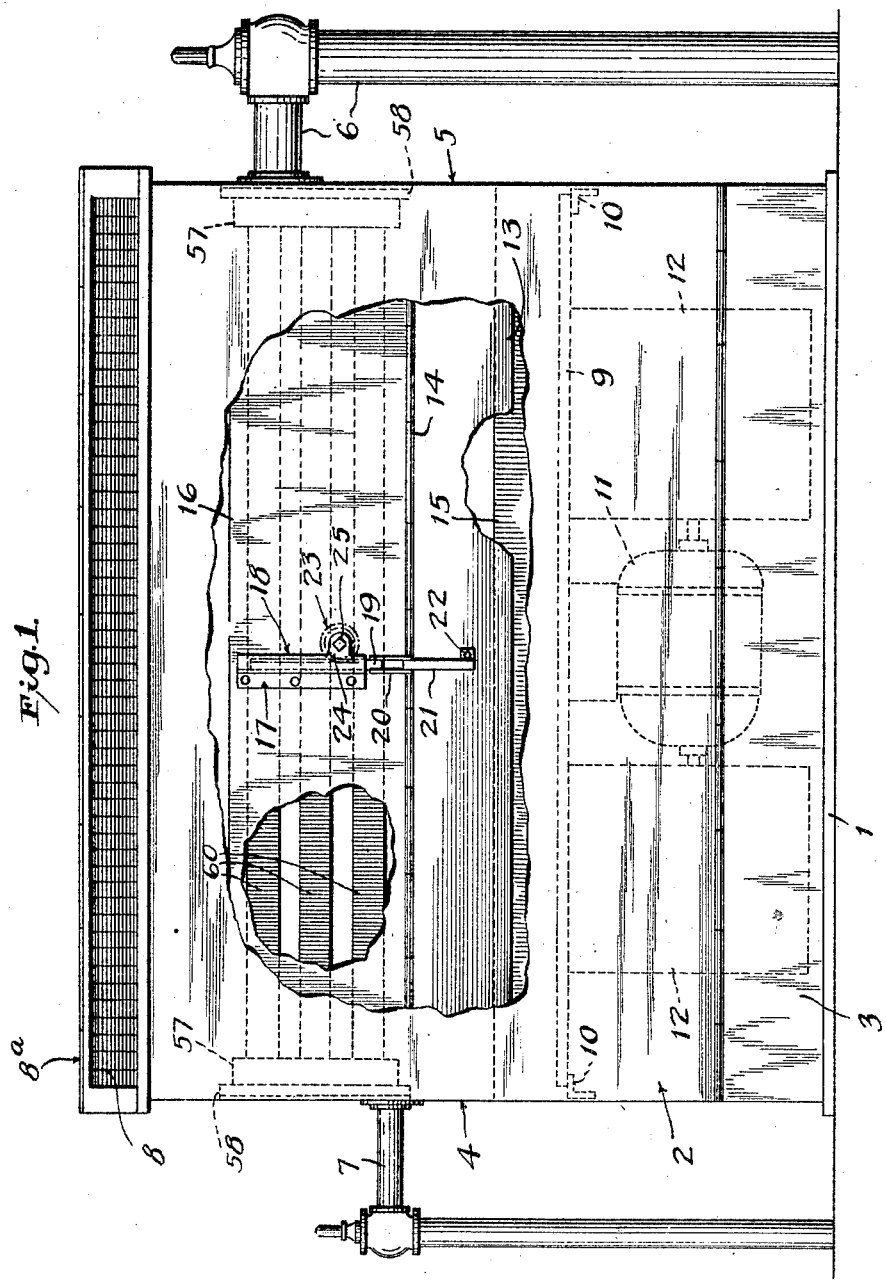

April 15, 1930.  M. J. CALLAHAN  1,754,260
LOW DOWN HEATING AND VENTILATING UNIT
Filed March 14, 1925   5 Sheets-Sheet 3
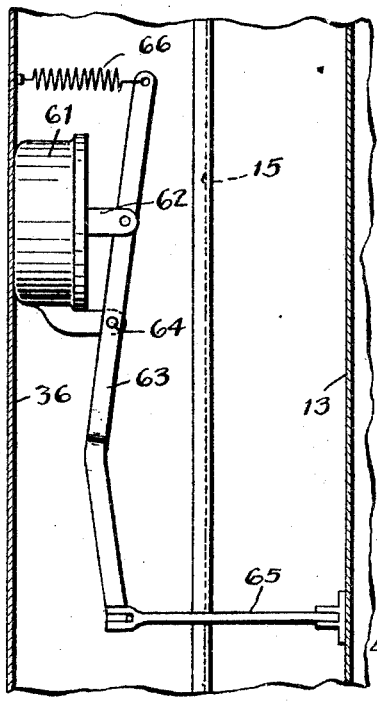
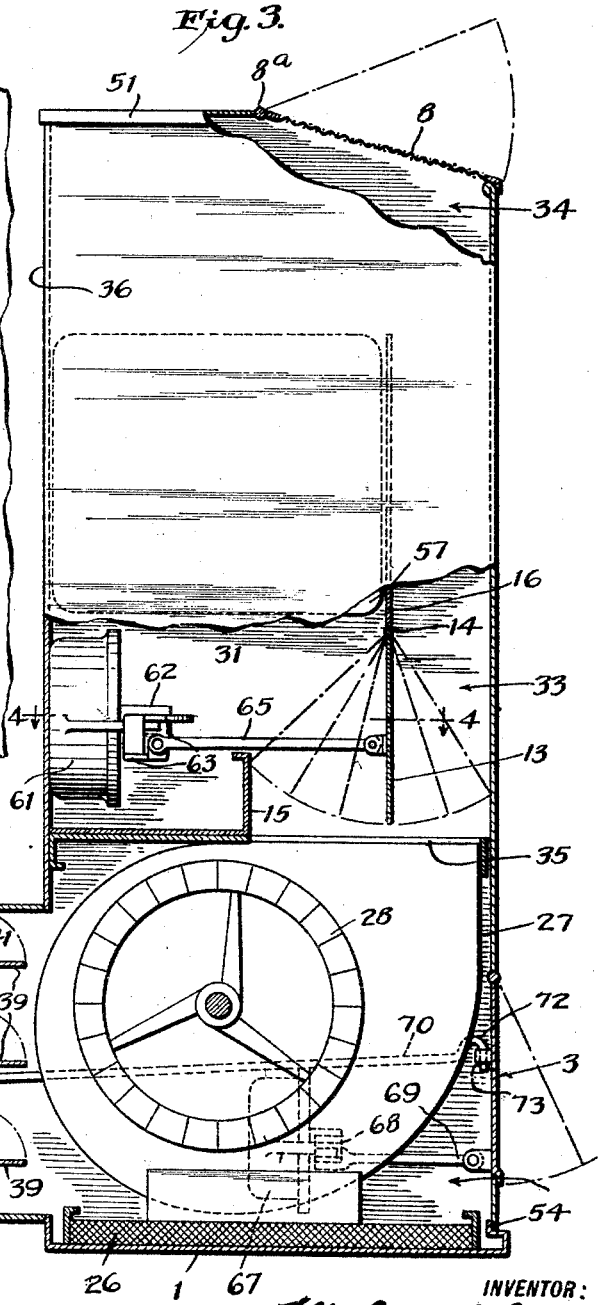

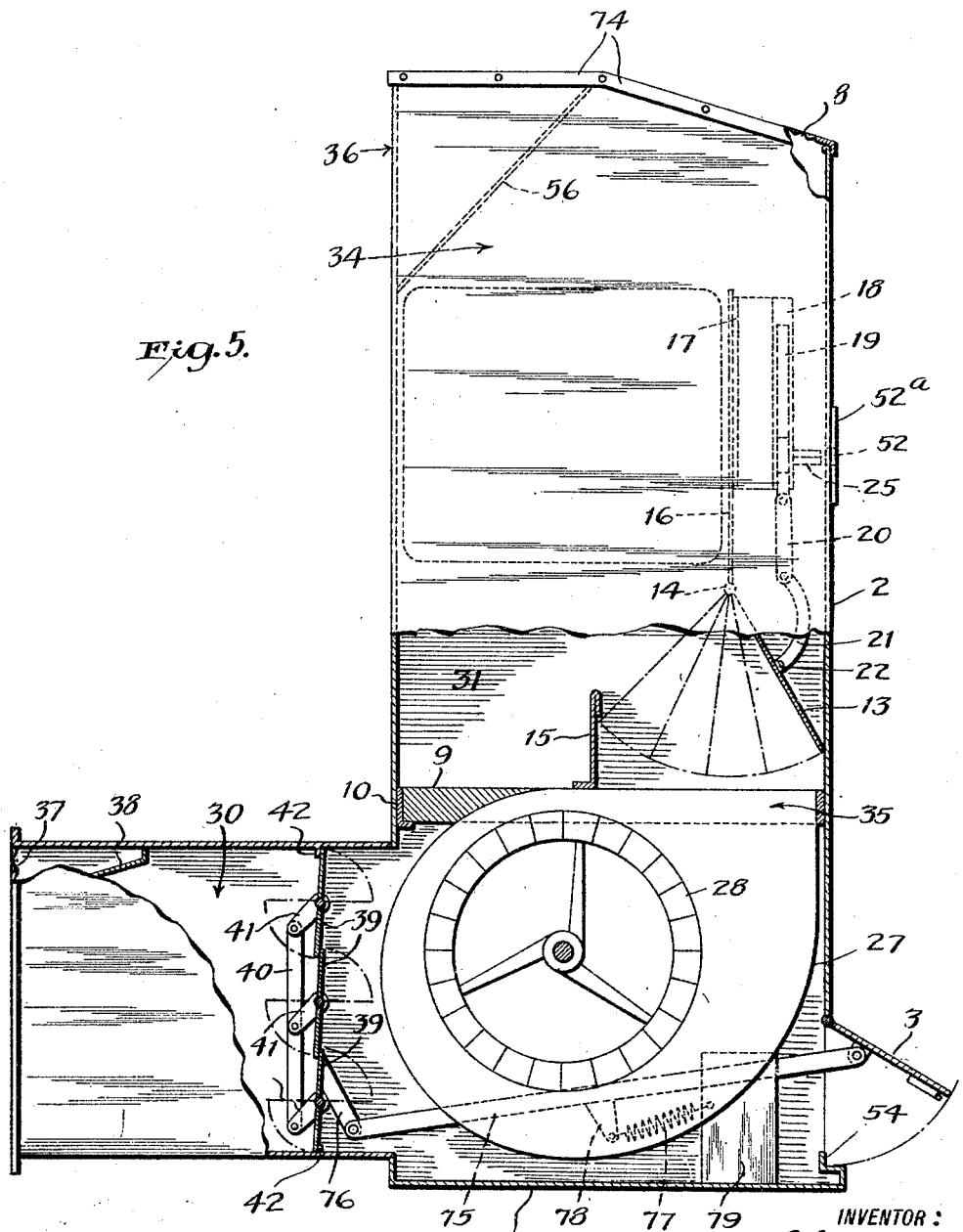

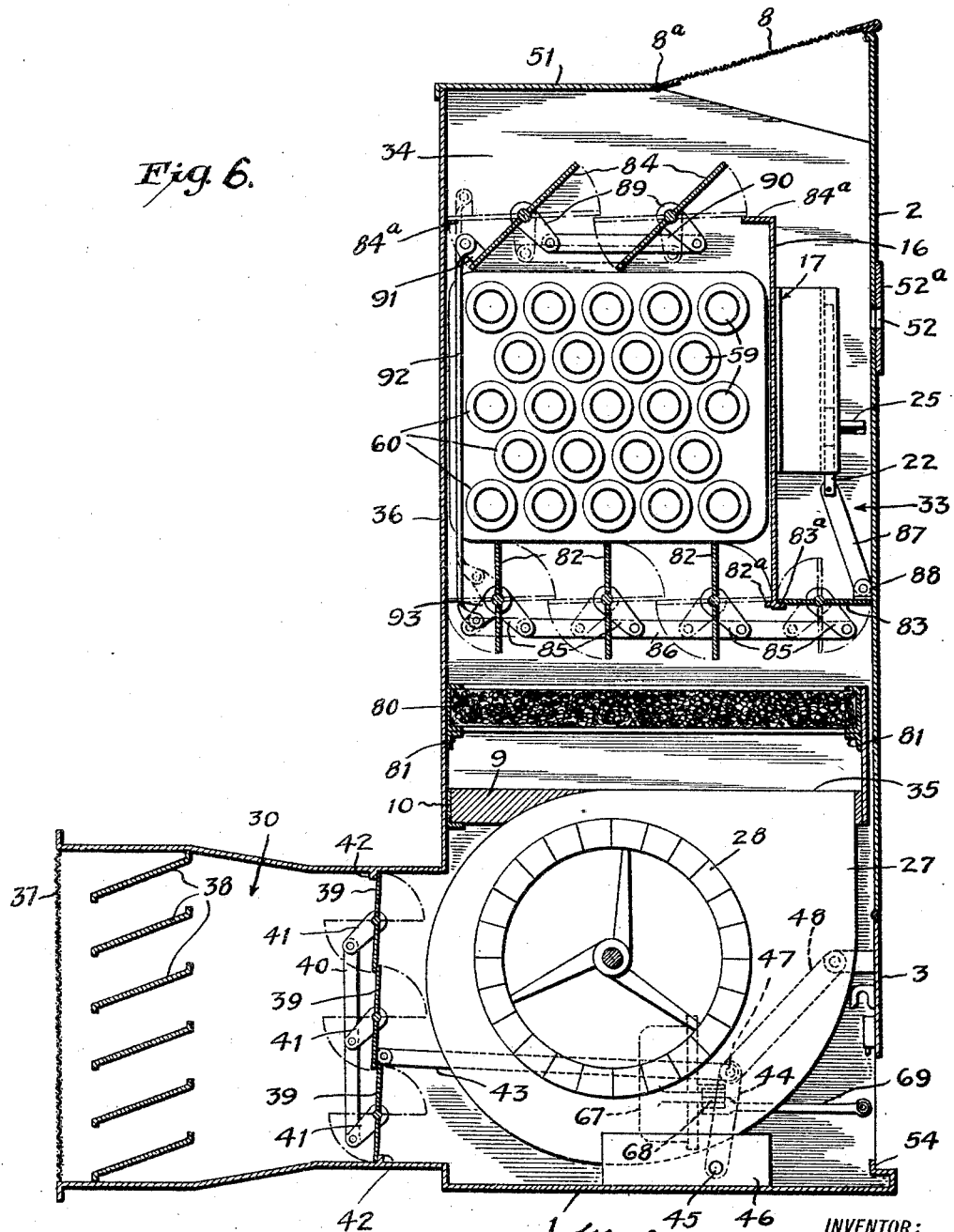

Patented Apr. 15, 1930

1,754,260

UNITED STATES PATENT OFFICE

MICHAEL J. CALLAHAN, OF NEW YORK, N. Y.

LOW-DOWN HEATING AND VENTILATING UNIT

Application filed March 14, 1925. Serial No. 15,513.

This invention relates to heating and ventilating apparatus, and particularly has reference to apparatus of the unit type adapted for use in schools and in the respective rooms thereof, in buildings wherein it is desired to maintain a predetermined temperature in a given room or rooms, in office buildings, hotels and similar structures wherein many of the rooms are not always in use and heat is wasted unless regulated and controlled in some local manner.

Heretofore heating and ventilating units have been manufactured and sold by me having an upright piano form and including certain essential elements embraced within a casing of comparatively small dimensions and into which the fresh air was introduced from the outside of the building through an inlet or fresh air duct extended across the window-sill and protruding more or less beyond the window sash which is raised for the accommodation of said duct; or the fresh air is taken from the outside of the building through an opening below the window-sill made through the wall of the building, the duct being extended through the opening in the wall for the purpose. Such units have given great satisfaction due to the presence of a mixing damper such as covered by my U. S. Patent No. 1,503,089 granted July 29, 1924, and also by my Patent No. 1,390,758 granted September 13, 1921. A demand, however, has grown for a heating and ventilating unit of greater compactness and high heating efficiency, and to meet this demand I have produced a heating and ventilating unit which I call the Peervent and which is characterized by the expression "Lowdown unit" due to the fact that it is constructed to take the fresh air from the outside of the buildings at the lowest possible point of the unit; that is to say, the fresh air is admitted or drawn into the casing at the bottom thereof as distinguished from the top thereof as in my unit covered by my aforesaid Letters Patent.

Among the objects of my present invention may be noted the following: to provide a heating and ventilating unit which is so short that it can be located under the average school-room window without interfering with the light passing through the latter, or with the raising and lowering of the window sash, and without obstructing the window-sill; to provide a heating and ventilating unit which is so shallow transversely as to offer very little obstruction in the aisle of the school-room next to the window at which the unit may be installed; to provide a heating and ventilating unit of a form, size and shape such that it may be readily installed in a recess in the wall of the room of installation and service so as to protrude but a short distance into the room, thus eliminating practically all obstruction in the aisle of a school-room, for example; to provide a heating and ventilating unit with its inlet chamber at the bottom of the casing and its heating chamber approximately in the middle of the casing, thus enabling a compact and simplified unit to be produced with high heating efficiency; to provide a heating and ventilating unit of such structure as to enable it to utilize, for heating purposes, an unusually small, light and compact radiator made of bronze tubing having a large radiating surface, combined at their opposite ends in headers or chambers or compartments through one of which distribution of the heating element is made and into one of which the tubes deliver the heating element for return to the source of supply; to provide in combination a small and compact unit including a radiator of compact form to which the steam and return nozzles may be coupled rigidly and in a manner such that the elements of the radiator cannot be twisted or mutilated by the operator or mechanic in coupling the steam and return nozzles thereto; to provide a heating and ventilating unit so constructed that its entire front can be removed and replaced in the fraction of a minute, thus giving easy access to the radiator, motor, fans and other mechanism forming part of the unit, and which front of the casing may also be readily raised and lowered when desired for any purpose and especially for the purpose of recirculation of the air in the room of installation or service through the unit; to provide a compact, efficient and cheaply constructed heating and ventilating unit which can be operated and run indefinitely quite economically and which will meet with the rigid requirements of the various State codes, and which can, in consequence of its structure, mode of operation and efficiency, be advantageously employed for the ventilation of libraries, churches, assembly halls, lodge rooms, school-rooms, hospitals, etc.; to provide a heating and ventilating unit of the type noted in the foregoing with a mixing damper which can be effectively operated either by hand or automatically, and with a multiplex inlet damper which can be operated effectively either by hand or automatically; and to provide a heating and ventilating unit of such size and form and construction as to enable it to be noiseless in operation, reliable in functional results and always in working order, and which will be of light weight, easy to handle, easy to install, and which will bring about a large saving in space in the room of service.

With the foregoing objects in view and others which will be detailed during the course of this description, my invention consists in the parts, features, elements and combinations of elements and mechanisms as hereinafter described and claimed.

In order that my invention may be clearly understood, I have provided drawings wherein:

Figure 1 is a front elevation of a heating and ventilating unit embodying my invention;

Figure 2 is a vertical transverse section of a unit embodying my invention, the form of the unit being somewhat different in details from that shown in Figure 1;

Figure 3 is a view similar to that of Figure 2 showing another form of my invention;

Figure 4 is a plan view of the means for adjusting and regulating the mixing damper shown in Figure 3;

Figure 5 is a view similar to Figure 2 showing another form of my invention; and Figure 6 is a view similar to Figure 2 showing other forms of my invention.

It is to be noted, however, with reference to the details of construction shown in the respective figures of drawings that the elements and mechanisms may be used interchangeably in the respective structures, and combined in various other ways within the scope of my invention. That is to say, in Figure 6 a filter for the air is employed, and such filter may be embodied in the other forms of my invention with very little change in the structure thereof; also in Figure 3 automatic means are shown for operating both the mixing damper and the duplex inlet damper, which automatic means can be employed interchangeably for the hand-operated means shown in the other form of my invention.

Referring to the drawings, and particularly to Figure 1, the numeral 1 indicates the base of the unit casing, 2 the front plate of the casing which has a hinged door 3, at its bottom. The opposite ends of the casing indicated at 4 and 5 are provided with openings through which pass the steam supply pipe 6, and exhaust or drain pipe 7, as usual. The top of the casing is provided with a hinged grille 8 through which the air is driven into the room of service, the front plate of the casing being adapted to move vertically, if desired, and simultaneously lift the grille 8 for recirculation and other purposes as hereinafter described. In this form of my invention a motor board 9 is supported on angles 10 at the opposite ends 4 and 5 of the casing, the motor 11 being suitably supported by the board 9, so that it will depend into the space between the board and the base 1 of the casing. The motor board also supports the casings 12 of rotary fans (not shown) which are operated by the motor substantially as described in my aforesaid patent, the motor board having openings therethrough into the chamber above the board in which the mixing damper 13 is arranged, the same being hinged at 14 along its upper edge so as to depend into, and freely swing in, the space above the motor board for the purpose of controlling the direction taken by the fresh air driven by the fans. The openings into the damper chamber, through the motor board 9 are defined by the front casing member 2 and the opposite ends 4 and 5 of the casing and also by the upstanding baffle plate 15 extending from end-to-end of the casing and operating as a stop or limiting means at the inner end of the swing or movement of the mixing damper 13, the front of the casing operating as a stop or limiting means for the forward movement of said mixing damper. The heating element (not shown in Figure 1) is arranged behind the partition 16 on which, along its lower edge, is hinged the mixing damper 13. At its middle, and extending vertically thereof, the partition 16 is provided with an angular bracket 17 secured in place by any suitable means having at its front edge a guiding channel formed by parallel flanges 18 in which slides a rack-bar 19 pivotally connected at its lower end to the upper end of a link 20, the lower end of which link is pivotally connected to the upper end of a curved arm 21, the lower end of which is fixed at 22 approximately midway to the face of the mixing damper 13. By this means the mixing damper may be shifted by hand, or swung backwardly and forwardly through the medium of a pinion 23 journaled in ears 24 of the bracket 17, the journal of the pinion being extended forwardly, and enlarged and squared, as at 25, for the application of a key or crank by which the pinion may be turned so that in meshing with the rack-bar the latter will be raised and lowered. The front plate 2 of the casing is provided with an opening surrounded by an escutcheon through which a key or crank may be entered for operating the pinion.

The space in which the motor and blowers are suspended will be termed the blower chamber; the space behind the blower chamber will be termed the inlet chamber; the space in which the mixing damper 13 operates will be called the damper chamber; the space behind the partition 16 will be called the heating chamber; the space between the partition 16 and the front plate 2 of the casing will be called the by-pass chamber; and the space above the partition 16 will be called the mixing and also the discharge chamber. The terminology will be readily understood upon reference to Figures 2, 3 and 5.

As will be presently seen upon reference to the other figures of the drawings, the front plate 2 may be raised and lowered in order to bring about recirculation of the air in the room of service through the unit, and this function may also be obtained by opening the door 3 at the base of the unit and front of the blower chamber. It will also be seen that, with the inlet chamber directly behind the blower chamber, the former has been located as low down as possible in the unit, thus enabling the entire unit to be made very short and capable of being set in place in a recess in the wall of a building under the window-sill of a window of average height from the floor of the room of service. In this way the operation of the window is not interfered with, light is not obstructed and the window-sill is left clear. Moreover, the opening for the inlet of fresh air into the room of service or installation, can be provided for when the plans of the building are laid out, thus avoiding expense of installation, breaking the walls of the building, economizing space, and very greatly facilitating the installation of the unit.

With the understanding that the features described in connection with the form of my invention shown in Figure 1 are in many respects the same as those shown in the form of my invention of Figure 2, the latter form will be readily understood. In this form of my invention all the features thereof, which are common to the form shown in Figure 1, will be indicated by like reference numerals, and it will be understood that the features of construction shown in Figures 1 and 2 may, in great measure, be interchanged and substituted the one for the other.

Referring to the construction shown in Figure 2, it will be seen that the base 1 of the casing is so formed as to receive between the shallow flanges a motor board 26, this board supporting the motor (not shown), having the central position of Figure 1, and the fan casings 27 in which are mounted the centrifugal fans 28 which draw in the air at their axes or eyes and throw it off at their peripheries, driving the same upwardly, as will be readily understood. Referring now to the foregoing terminology, the blower chamber is indicated at 29, the inlet chamber at 30, the damper chamber at 31, the heating chamber at 32, the by-pass chamber at 33 and the mixing and discharge chamber at 34. The passage between the blower chamber and the damper chamber and between the front wall of the casing and the baffle plate 15 will be conveniently indicated by 35.

The inlet chamber for fresh air is formed by extensions from the rear wall 36 of the casing, providing a finite structure which may be readily set in place in the opening in the building wall provided therefor; and at the outer end of the inlet chamber 30 a grille 37 is provided to prevent birds, insects, dust, particles, etc., entering the chamber. To keep out rain, a plurality of stationary louvers 38 are set in the chamber 30 adjacent the screen or grille 37. In a narrow portion of the inlet chamber 30 a multiplex damper mechanism is applied comprising a plurality of duplex louvers 39 centrally journaled in the casing and having their journals connected by link-bar 40 through the medium of arms 41 carried by the journals. In this way the operation of any one of the louvers 39 will cause the simultaneous operation of the others and the movements of the multiplex damper are limited by the oppositely disposed stationary stops 42. As shown in this form of my invention one of the louvers is pivotally connected to a link 43 at one end of the latter, the opposite end of which is pivotally connected to the upper end of a fulcrum-bar 44, the lower end of which is pivotally supported at 45 upon the board 26, and to prevent said bar 44 from wabbling, it is embraced by a bracket 46 mounted on the board 26 and between the members of which the said bar may have oscillating movement on its fulcrum 45. At the junction point 47 a link 48 is pivoted at its inner end, the outer end being pivotally secured to a lug 49 fixed to the inside of the front plate 50 of the casing. In this form of my invention the front plate of the casing is not provided with a hinged door at its bottom; but, is mounted on the casing so as to slide vertically and be raised and lowered so as to likewise manipulate the grille 8, hinged at $8^a$ to the front edge of the top 51 of the casing. The front plate 50 of the casing is provided, at a proper point, with an aperture 52, protected by escutcheon $52^a$ through which a key or crank may be inserted for application to the end 25 of the journal on which the operating pinion 23 is mounted for actuating the mixing damper 13 as heretofore described. The lower edge of the front plate 50 of the casing is provided with a flange 53, adapted to interlock with the front edge 54 of the base, which is flanged correspondingly for the purpose. It will be seen that when the front plate is raised and lowered, the linkage connection therefrom to the duplex inlet damper will operate the latter correspondingly; that is to say, when the front plate 50 is raised to produce an opening at the bottom of the casing, the linkage connection will close the dampers 39, and hold them set in the full line position shown in Figure 2. When, however, the front plate 50 is lowered, or in normal position, the linkage connection will open the damper so that the louvers thereof will be in the dotted line position. This manipulation means that, for normal operation of the unit, the front plate 50 will be lowered, the dampers will be open, and the grille 8 at the top of the apparatus will be lowered. Thus fresh air will enter through the inlet chamber 30 into the blower chamber 29, drawn by the fans 28, and driven by the latter through the passage 35 into either one or both of the chambers 31 and 33. On the other hand, when the front plate 50 is raised the inlet dampers will be closed and the grille 8 at the top of the casing will be raised. Thus, the cold air in the room of service, or installation of the unit, naturally descending to the floor and base of the unit, will enter the opening at the front of the casing into the blower chamber, being drawn thereinto by the fans, and be driven through the passage 35 into either one or both of the chambers 31 and 33 according to the position of the mixing damper 13. It may be noted that the adjustment of the front plate, either up or down, respectively raising and lowering the grille 8, does not bring about any modification in the operation of the unit, so far as the grille 8 is concerned, it being understood that the grille 8 is hinged and thus enabled to be operated by the front plate 50 for convenience and ingress rather than for an operational or functional purpose of the unit. It is also noted that the linkage connection between the front plate 50 and the multiplex inlet damper is a form of toggle mechanism.

As will be seen from the mode of operating the mixing damper 13, as described with reference to Figure 1, and now apparent in Figure 2, the said damper can be shifted between two extremes to any one of a plurality of positions, and that when the mixing damper is in the full line position of Figure 2 the by-pass chamber 33 is entirely cut off, while the air driven by the fans has free ingress to the damper chamber 31 and heating chamber 32 in which the radiator is mounted in any suitable manner. When, however, the mixing damper 13 is at the opposite extreme of its movement, or in contact with the baffle 15, the damper chamber and heating chamber are completely cut off and the cold air driven by the fans will pass through the chamber 33 and by-pass the heater. In either event the air will pass through the discharge chamber 34 and through the grille 8 at the top of the casing; but, in passing through the heating chamber the hot air, in greater volume, will be deflected or shunted off the plate 56 set diagonally between the hinges of the grille and the top of the heater. If the mixing damper 13 be adjusted into any one of the positions indicated by the intermediate dotted lines shown in Figure 2, or into any one of many other intermediate positions, the air driven by the fans will pass, according to such adjustment, proportionally through the by-pass chamber 33 and the heating chamber 32 into the mixing and discharge chamber 34 where the cold and hot air will be mixed and issue into the room of service tempered to the degree predetermined by the adjustment of the mixing damper.

Referring to Figures 1 and 2, and with particular reference to the radiator, it will be seen that, at the opposite ends of the unit, headers 57 are secured in place by brackets 58 into which the steam pipe 6 and the drain pipe 7, are respectively fastened, the headers receiving the opposite ends of the radiator tubes 59, which are thus held in position relatively, quite strongly and rigidly and are prevented from being injured in any manner when the coupling of the pipes 6 and 7 is made to the headers. The headers are chambers, the one for receiving and diffusing the heating fluid and the other for receiving and draining the condensation or liquid to be returned or exhausted. The radiator, in this instance of my invention, is made most efficient by the use of seamless, bronze tubing around which is wound and mechanically fastened a helical surface constituting fins 60. The tubes are mechanically coupled in any suitable manner, to the headers 57 which are made of brass. This construction, constituting a multitube radiator, not only gives strength and durability to the radiator; but, provides an immense radiating surface in small compass and very light structure limited only by the number of tubes employed, or the diameter of the helix providing the radiating fins.

In the form of my invention shown in Figures 1 and 2, the mixing damper 13 may be automatically operated and controlled thermostatically, and this is also true of the multiplex inlet damper, in manner similar to the dampers now to be described with reference to the form of my invention shown in Figures 3 and 4, in which latter figures all the parts and features, similar to those in the structures of Figures 1 and 2, will be indicated by like reference numerals.

In Figure 3 the parts and features of the inlet chamber 30, the multiplex damper, the motor and blower means, the mixing damper, the radiator, the grille at the top of the casing, and certain details of construction pertaining to said features, are all the same as in Figure 2, and are indicated by like reference characters. As in Figure 1 of the drawings, the unit of Figure 3 has its front plate 2 provided at its bottom with a hinged door 3 adapted to be opened for recirculation, inspection and other purposes. The means for operating the mixing damper and the means for operating the inlet damper are different and will now be described.

In the form of my invention of Figures 3 and 4, the mixing damper 13, hinged to the partition 16, and adapted to swing between the front plate 2 of the casing and the baffle 15, is actuated and controlled by a motor in the form of a so-called sylphon 61 secured to the back plate 36 of the casing within the chamber 31. The motor casing 61 contains a diaphragm or bellows (not shown) which actuates a plunger 62 extending through the motor casing, to which is pivoted a lever 63, also pivoted at its adjacent end to an ear or lug 64 on the motor casing. The opposite end of the lever 63 is pivotally connected to a link 65, in turn pivoted at its outer end to the mixing damper 13. The lever 63 is actuated by the motor against the control or pull of a spring 66 secured to the lever adjacent the motor casing and to the back plate 36 of the unit casing. Thus, when air is admitted to the sylphon 61 the plunger 62 will be driven outwardly, turning the lever 63 on its fulcrum at 64 causing the link 65 to shift the mixing damper 13 toward the front plate 2 of the unit casing. The admission of air to the sylphon is under control of either thermostatic or electrical means, or under hand control conveniently located in the room of service or installation of the unit. When the motor 61 loses control of the lever 63, as by bleeding air through an aperture provided in the motor casing, reverse action of the lever 63 will take place, thus shifting the mixing damper in the opposite direction or toward the baffle 15. The bleeding action of the motor and the movement of the lever 63 are aided by the spring 66, which takes control of the lever and of the mixing damper when the motor loses control. Hence, the mixing damper may be automatically shifted thermostatically or, as otherwise described, according to the temperature in the room of service so as to enable more or less of cold air to pass through the heating chamber and the by-pass chamber into the mixing chamber 34, there to be mixed and delivered through the grille 8 into the room of service. If, for any reason, the temperature of the room of service rises suddenly, the damper 13 may be shifted into contact with the baffle 15, thus enabling the cold air to be driven entirely through the by-pass chamber 33 into the chamber 34 so as to pass, practically at atmospheric temperature into the room of service. If, for any reason, the temperature in the room of service drops suddenly, the mixing damper 13 may be automatically shifted into engagement with the front plate 2 of the casing, thus completely closing the by-pass chamber and causing all the air, driven by the fans, to pass successively through the chambers 31, 32 and 34 and through the grille at the top of the casing, heated to its maximum.

The multiplex inlet damper may be actuated either automatically or manually, and various means may be employed for the purpose. In Figure 3 I have shown both automatic means and manual means as follows: A motor 67 of the sylphon type, the same as motor 61, is similarly caused to actuate a lever 68 and link 69, the latter being pivoted to the hinged door 3 of the front casing member 2. The linkage between the door 3 and the motor 67 may be substantially the same as that shown in Figure 4 for operating the mixing damper. Thus, when air is admitted to the sylphon 67, automatically or otherwise, the door 3 may be shifted into the dotted line position Figure 3. This will cause the multiplex damper members 39 to be shifted into dotted line position to close the inlet chamber 30, against the admission of fresh air into the blower chamber 29. This is done by providing a link 70 between the door 3 and one of the damper members 39, the other end of the link 70 being pivotally connected, as shown in Figure 3, to the middle damper member 39 as at 71 to a lug secured to said damper member. The other end of the link 70 is formed into a hook 72 which engages a loop 73 on the inside of the door 3. Thus, when recirculation of the air in the room through the unit is desired, the sylphon 67 is set in action, causing the door 3 to be opened, and the link 70 to be shifted, causing the multiplex inlet damper to be closed. Cold air, falling to the bottom of the casing or floor of the room, will enter the opening at 3, being drawn in by the fan, and be driven by the latter through the unit in any one of the ways previously described. If it is desired to operate the recirculating means manually, the sylphon 67 and linkage connection may be omitted, or the linkage connection may be made sufficiently flexible to permit the members thereof to move vertically when the front plate 2 of the casing is lifted manually, causing the grille 8 to rise into approximately the dotted line position Figure 3, and the multiplex damper members 39 to be closed by the link 70, hooked to the door 3 and caused to rise with the front plate 2.

As previously indicated, the mixing damper operating means and the inlet damper operating means of Figures 1, 2 and 3, may be interchanged or substituted the one for the other, as will be readily understood, with slight mechanical change.

In the form of my invention shown in Figure 5, the inlet damper and connecting means, the hinged door 3, the motor and blower, the mixing damper, heater and incidental features of construction are all substantially the same as shown in Figures 2 and 3. The mixing damper actuating and controlling means of Figure 5 are shown to be the same as in Figure 2, and the mode of suspending the motor and blowers in the blower chamber is the same as in Figure 1. There are certain details of construction and mechanisms which differ and will now be described. The top of the casing, while provided with a grille 8, is entirely rigid, both the inclined front portion and horizontal portion having their frame 74 made rigid and fixed in place on the back plate 36 and ends of the casing. The front plate 2 has the swinging door 3 at the bottom the same as in Figures 1 and 3, and the multiplex inlet damper is actuated by the link-bar 75, pivoted at its front end to the door 3 and at its rear end to a rigid arm 76 extending from the lower member 39 of the multiplex inlet damper. When the door 3 is opened, the inlet damper members will be closed as shown in full lines in the figure, the operation being aided by the pull of a spring 77 hooked to lug 78 carried by the bar 75, and also to an upstanding bracket 79 between the plates of which the bar 75, is guided to prevent undue lateral movement. When the door 3 is closed the damper members 39 will be opened or shifted to the horizontal dotted line positions shown in Figure 5, the movement of the bar 75 being against the pull of the spring 77, the latter being distended, placed under tension and thus normally tending to shift the link toward the front of the machine with a normal tendency to open the door 3, and close the damper members 39. The mixing-damper is hand-operated and controlled in the same manner as described with reference to the structure shown in Figure 2. The mode of operation of this form of my invention will be readily understood from the description given in connection with the other figures.

Figure 6 of the drawings shows a form of unit having several novel features; but, also containing a number of features common to the forms previously described. That is to say, the fresh air inlet and contained mechanisms may be the same as in Figures 2, 3 and 5; the motor and blowers may be the same as in Figures 2 and 3; and the recirculating means may be the same as in Figures 1, 3 and 5, the grille 8 being hinged, and made in accordance with the showing of Figures 1, 2 and 3. The radiator is the same as described with reference to the other forms of my invention. In Figure 6 I have shown, in the chamber immediately above the blower chamber, an air filter indicated at 80, the same being supported at the back and front of the casing on angles 81, or in any other suitable way. By placing the filter 80 in the damper chamber 31 between the blowers and mixing damper, I am enabled to filter and clear the air driven by the blowers of all foreign substances. The filter may be of any of the commercial types; but, I have found a filter composed of steel-fiber treated with an adhesive substance to operate very effectively and give satisfaction. The fiber may be held in a frame capable of preventing it from being displaced under agitation of the air. It will be understood that other materials may be used than steel-fiber, the requisite thereof being that they shall permit the free passage of the air driven by the fans, be capable of preventing the passage of insects, or substances which may pass through the grille at the inlet passage or chamber, and have the characteristics or quality of holding, absorbing or retaining a liquid, or viscous substance, so that particles of dust and dirt can be caught and barred from passage to the room of service, and disinfectant and medicinal vapors or fluids can be discharged into the room of service.

The mixing damper in this form of my invention is multiplex in form and is shown to consist of a plurality of damper members 82, arranged in the space below the radiator and between the back plate 36 of the casing and the partition 16 forming the front of the heating chamber. Another damper member is indicated at 83, pivotally mounted at the entrance to the by-pass chamber 33. The damper 83 controls the passage around the radiator, while the dampers 82 control the passage through the radiator. In addition to the dampers just described, I provide at the top of the radiator in the discharge chamber 34 other dampers 84 which control the passage of air from the heating chamber into the discharge chamber. The dampers 84 operate both in the heating chamber at its top, and the discharge chamber 34, while the dampers 82 operate both in the heating chamber, at its bottom, and the damper or filter chamber 31, and the damper 83 operates in the by-pass chamber and filter chamber. All the dampers 83, 82 and 84 are linked together for conjoint operation, as follows: each of the dampers 82 and 83 is provided with an arm 85 extending from its axis, and said arms are connected pivotally to a bar or link 86, so that all of said dampers shall operate together. However, dampers 82 are arranged in parallelism with each other so that each thereof will be shifted in the same direction and to the same extent together; but, damper 83 is set on its axis at a right angle to dampers 82, so that when damper 83 is shifted to close the entrance to the by-pass chamber 33 the dampers 82 will be shifted to open the entrance to the heating chamber 32, this position of the dampers 82 and 83 being shown in full lines in Figure 6. The reverse operation takes place when the dampers are reversely shifted; that is to say, when damper 83 is moved to the dotted line positions so as to open the passage to chamber 33, the dampers 82 will be shifted to close the entrance to the heating chamber 32. The dampers 82 and 83 may be shifted into any one of many intermediate positions between the extremes just described, and this may be accomplished by either hand means or automatic means such as described in connection with the other forms of my invention. The hand-operated means shown in Figure 6 are the same as shown in Figures 1, 2 and 5, excepting that the rack-bar 20 in Figure 6 is directly connected pivotally to one end of a link 87, the opposite end of which is pivotally connected at 88 to a lug on the damper member 83. Otherwise the operating means are the same as shown in Figures 1, 2 and 5, and like parts are similarly designated. The dampers 84 are each provided with a crank arm 89 extending from its axis, said arm being pivotally connected to a link 90 for conjoint operation. The rear damper member, at its rear end, is provided with a lug 91 to which is pivotally connected the upper end of a long bar or link 92, the lower end of which is connected pivotally to an arm 93 extending rearwardly from the axis of the rear damper member 82, so that when the lower dampers 82 are shifted to close the entrance to the heating chamber 32, the upper dampers 84 will be shifted simultaneously to close the exit from the heating chamber or entrance into the discharge chamber, as clearly shown by the dotted line positions of the respective dampers 82 and 84. As previously described, when this condition exists, viz: the heating chamber being shut off from the admission of air and the delivery of air, the by-pass chamber 33 will be open for the admission and passage of cold air, and vice versa.

The mode of operation of this form of my invention will be understood when it is remembered that any one of the structures shown in Figures 2, 3 and 5, at the bottom of the unit, may be installed so that the admission of fresh air may be controlled, the air driven by the blowers into the upper part of the unit, and recirculation through the unit can take place all as has been described. Additionally, the air traversing the passage 35 from the blowers, is filtered in the chamber 31 through the filtering medium 80, and then passes through the upper chambers and is discharged into the room of service according to the position of the dampers 82, 83 and 84. That is to say, with the by-pass damper 83, in position as shown in full lines, and the dampers 82 and 84, in position as shown in full lines, all the air driven by the blowers and filtered will pass through the heating chamber and receive its maximum temperature before delivery into the room of service through the grille at the top of the unit. The delivery directly through the grille is aided by the position of the dampers 84, as normally set with reference to the dampers 82, because said dampers 84, as normally set for the passage of hot air, operate as deflectors to shunt and direct the hot air through the grille 8, thereby preventing it from becoming pocketed in the angular space of the discharge chamber 34, directly under the top plate 51 of the unit casing. On the other hand, when it is desired to by-pass the heating chamber with cold air, the damper 83 is shifted into the dotted line position, (open) which causes the dampers 82 and 84 to be shifted into the dotted line positions, (closed) the latter dampers thus completely cutting off and boxing in the heating chamber and heating element contained therein. This position of the dampers enables the air, driven by the blowers through the filter, to pass approximately at atmospheric temperature through the by-pass chamber 33 and discharge chamber 34 and grille 8 into the room of service. These two extremes of adjustment can be indefinitely varied, as by shifting the damper 83 from the full to the dotted line positions and simultaneously shifting the dampers 82 and 84, proportionally, thus enabling the air, driven by the blowers through the filters, to pass partly through the by-pass chamber 33 and partly through the heating chamber 30, and converting the discharge chamber also into a mixing chamber and causing the hot and cold air to combine therein and be delivered at any predetermined temperature, above atmospheric temperature, through the grille 8 into the room of service. The adjusting and controlling means heretofore described enables the interacting dampers to be shifted manually or automatically into any one of a plurality of positions between the extremes, in order to deliver air, into the room of service, at any predetermined temperature desired. Dampers 84 are limited in their movements by stops 84$^a$, dampers 82 by stop 82$^a$, and damper 83 by stop 83$^a$.

In all forms of my invention, the sliding front plate of the casing can be raised sufficiently to permit inspection, repairs and adjustments to be made of the motor, blowers, filter, dampers and radiators, or the said front plate may be entirely removed as occasion requires.

As previously explained, the mechanisms which have been described as constituting the various alternative forms of my invention, may be interchanged, so that any one of the units shown in the respective figures can be made to operate precisely as desired and equipped precisely as required, so as to meet the demands of commerce, the fastidiousness of architects, builders and public service boards, and to satisfy both structurally and economically variant ideas of what the unit should do or be caused to do in any given situation.

I desire to lay stress upon the filter 80 as an important part of my invention, since it can be made use of at any time to disinfect a room, served by the unit, without disturbing or affecting other sections or rooms of the building, and because it requires renewal or other attention only semioccasionally. In fact, the filter structure has a number of useful and important purposes, since it can be located in any of the chambers of the unit between the blower and discharge chambers, and since it can carry any kind of solution or material, or substance for cleansing, purifying, medicating or disinfecting purposes, having reference to the air discharged into the room of service or the condition of the air in the room of service. It will thus be seen that the unit is useful and important in schools, hospitals, public assembly rooms, sick rooms and other places where the functional results suggested can be attained.

Having thus described my invention what I claim and desire to secure by Letters Patent is:

1. A heating and ventilating unit comprising a casing divided into a blower chamber, fresh air inlet chamber, heating chamber, and discharge chamber, the inlet and blower chambers being one behind the other at the bottom of the casing, and the discharge chamber being at the top of the casing; and means for controlling the passage of air from the blower chamber through the heating chamber.

2. A heating and ventilating unit comprising a casing having air heating means, an air discharge chamber, a blower chamber at the bottom of the casing, and an inlet chamber adjacent the blower chamber; a damper mechanism interposed between the inlet chamber and the blower chamber; and means whereby the damper may be shifted to control the admission of air to the blower chamber.

3. A heating and ventilating unit comprising a casing having a door in its front wall at the bottom, a blower chamber at its bottom and a fresh air inlet chamber adjacent thereto; a multiplex damper interposed between the two chambers; and means connecting the said door with said damper for actuating the damper to control the passage of air from one chamber to the other.

4. A heating and ventilating unit comprising a casing having a blower chamber and a fresh air inlet chamber adjacent thereto; a multiplex damper arranged between the two chambers and controlling the passage of air from the one to the other; and means for actuating the damper including a rod connecting the members of the damper for simultaneous operation, a bar connected to one of the damper members, a movable member to which the bar is pivotally connected, and means for actuating said member.

5. In combination with the inlet chamber of a heating and ventilating unit, a multiplex damper mounted in the chamber comprising a plurality of damper members pivotally mounted and connected for simultaneous operation; a bar pivotally connected to one of the damper members; a movable fulcrum on which the bar is pivotally mounted; and means for actuating the bar to shift the damper.

6. A heating and ventilating unit comprising a casing having a blower chamber and an inlet chamber; a multiplex damper located in the inlet chamber and controlling the admission of air to the blower chamber; and toggle mechanism for actuating the multiplex damper.

7. In combination with a heating and ventilating unit having at its bottom an inlet chamber and a blower chamber; a damper for regulating the admission of air from the inlet chamber to the blower chamber; the casing having at its front a movable member; and connections between the damper and the said movable member for shifting the damper proportionally with the movement of said member, substantially as described.

8. A heating and ventilating unit comprising a casing having a blower chamber and an inlet chamber; a multiplex damper controlling the admission of air to the blower chamber; a toggle mechanism for actuating the damper; and automatic means for actuating the toggle mechanism.

9. A heating and ventilating unit comprising a casing having a blower chamber and an inlet chamber; a damper for regulating the admission of air to the blower chamber; the casing having at its front a movable member; and a toggle mechanism connected to the damper and to the movable member for regulating the action of the damper.

10. A heating and ventilating unit comprising a casing having inlet and blower chambers at its bottom; a damper between the two chambers for controlling the admission of air to the blower chamber; said casing having a vertically sliding front member; and toggle mechanism between the said damper and member, whereby as the said member is shifted, the damper is shifted correspondingly.

11. A heating and ventilating unit comprising a casing having a blower chamber and an inlet chamber at its bottom; a damper controlling the admission of air to the blower chamber; the casing having a discharge outlet at its top and a grille hinged to the top of the casing and extending over the outlet; a vertically sliding member closing the front of the casing and extending under the grille; and operating connections between the damper and said member whereby the damper and grille may be simultaneously shifted, substantially as described.

12. A heating and ventilating unit comprising a casing having a blower chamber and an inlet chamber at its bottom; a damper for regulating the admission of air to the blower chamber; the casing having a movable member at its bottom; connections between the movable member and the damper for shifting the latter; and means for normally holding the casing member in closed position.

13. A heating and ventilating unit comprising a casing having at its bottom a blower chamber and an inlet chamber; a damper for regulating the admission of air to the blower chamber; the casing having a movable member at its bottom; a connection between the movable member and the damper for shifting the latter; and means adapted to normally hold the casing member closed and the damper open.

14. A heating and ventilating unit comprising a casing having at its bottom a blower chamber and at its top a discharge chamber; the casing having a member vertically slideable to provide an opening at the bottom of the casing; an inlet damper and connections therefrom to the slideable member, whereby, when the casing member is shifted, the damper may be closed, so that the blower may draw air into the bottom of the casing through the opening and drive the same through the discharge chamber.

15. A heating and ventilating unit comprising a casing having a heating chamber at its back; a damper located at the entrance to the heating chamber; means for actuating the damper located at the front of the casing and accessible for operation through said casing front, said damper actuating means including a rack-bar, pinion and connection to said damper.

16. A heating and ventilating unit comprising a casing having a blower chamber, a heating chamber and a discharge chamber; a mixing damper located at the entrance to the heating chamber; and means within the casing for actuating the damper including a rack-bar, a pinion for actuating the bar, and a connection between the bar and damper.

17. A heating and ventilating unit comprising a casing having a chamber at its bottom; a support defining the top of said chamber and having a passage therethrough; a motor and blower suspended in said chamber from the bottom of said support; a fresh air inlet at the bottom of said casing for supplying air to the blower; heating means above the support for the air driven by the blower; and a discharge chamber for the heated air at the top of the casing.

18. A heating and ventilating unit comprising a casing having a blower chamber and an inlet chamber both at its bottom; a heating chamber located above the blower chamber; a discharge chamber at the top of the casing with an opening for the discharge of air into the room of service; and a deflector within the casing between the heater and the discharge opening for shunting the heated air through the said opening.

19. A heating and ventilating unit comprising a casing having a heating chamber at its back; a damper located at the entrance to the heating chamber; means for actuating the damper located at the front of the casing and accessible for operation through said casing front; said damper actuating means including a rack-bar, pinion and connection to said damper, the pinion shaft being square and extended to adjacent the casing, whereby said extension may be manipulated for actuating the damper.

20. A heating and ventilating unit comprising a casing divided into a discharge chamber, a heating chamber, a damper chamber, and a blower chamber, said several chambers being one below the other in the order named; the discharge chamber having a permanently open discharge passage at its top; a fresh air inlet chamber adjacent the blower chamber; a damper pivotally mounted in the damper chamber and adapted to be shifted to control the passage of air through the heating chamber; a damper in the fresh air chamber controlling admission of air thereto; the casing having a front plate provided with means at its bottom whereby an opening may be produced to permit air to enter the blower chamber from the room of service; means for shifting the pivoted damper; and means connecting the fresh air damper with the means at the bottom of the front plate, whereby recirculation of the air in the room of service, through the unit, may be brought about under control of and regulated by the dampers.

21. A heating and ventilating unit comprising a casing embodying a heating chamber; a by-pass chamber; damper mechanisms arranged at opposite ends of said heating chamber; and means for actuating said damper mechanisms, whereby they may be simultaneously operated to either entirely open the heating chamber or entirely close said chamber.

22. A heating and ventilating unit embodying a heating chamber and a by-pass chamber beside the same; a damper at the entrance to the heating chamber; a damper at the entrance to the by-pass chamber; a damper at the exit of the heating chamber;

and means connecting the several dampers for simultaneous operation, whereby when the by-pass damper is operated to close the by-pass chamber the other dampers will be simultaneously opened, and vice versa.

23. A heating and ventilating unit embodying a heating chamber and a by-pass chamber; a damper at the entrance to the by-pass chamber; a damper at the exit of the heating chamber; and means connecting the two dampers whereby, when one is open, the other will be simultaneously closed, and vice versa.

24. A heating and ventilating unit comprising a casing having a heating chamber at its back; a by pass chamber at its front parallel with the heating chamber; a damper located at the entrance to the heating and by-pass chambers; and means for actuating the damper located at the front of the casing within the by-pass chamber and accessible for operation through said casing front.

25. A heating and ventilating unit comprising an enclosing casing having an inlet chamber at its bottom, a discharge chamber at its top, heating and by-pass chambers between the top and bottom chambers; a blower disposed in a chamber below the heating and by-pass chambers and adjacent the inlet chamber; and a filter arranged in the casing below the heating chamber whereby fresh air entering the inlet chamber may pass through the filter before entering the heating chamber.

26. A heating and ventilating unit comprising an inclosing casing having an inlet chamber, a discharge chamber, heating and by-pass chambers; a blower chamber; and filtering means disposed in the path of the air through the unit and adapted to clean the air during its passage to the heating and by-pass chambers.

MICHAEL J. CALLAHAN.